(12) United States Patent
Keller et al.

(10) Patent No.: US 8,215,647 B2
(45) Date of Patent: Jul. 10, 2012

(54) JOURNAL SEAL FOR ROLLING BEARINGS

(75) Inventors: Karl Keller, Hilchenbach (DE); Konrad Roeingh, Hilchenbach (DE); Daniel Knie, Freudenberg (DE)

(73) Assignee: SMS Siemag Aktiengesellschaft, Düsseldorf (DE)

( * ) Notice: Subject to any disclaimer, the term of this patent is extended or adjusted under 35 U.S.C. 154(b) by 251 days.

(21) Appl. No.: 12/448,954

(22) PCT Filed: Jan. 28, 2008

(86) PCT No.: PCT/EP2008/000637
§ 371 (c)(1),
(2), (4) Date: Jul. 16, 2009

(87) PCT Pub. No.: WO2008/092616
PCT Pub. Date: Aug. 7, 2008

(65) Prior Publication Data
US 2010/0109253 A1    May 6, 2010

(30) Foreign Application Priority Data

Jan. 29, 2007 (DE) .................. 10 2007 005 155

(51) Int. Cl.
*F16J 15/32* (2006.01)
(52) U.S. Cl. .................. 277/562; 277/549; 277/572
(58) Field of Classification Search .............. 277/549, 277/562, 564, 572
See application file for complete search history.

(56) References Cited

U.S. PATENT DOCUMENTS

| | | | | |
|---|---|---|---|---|
| 2,736,586 A * | 2/1956 | Riesing | .......... | 277/573 |
| 3,545,774 A * | 12/1970 | Rickley | .......... | 277/564 |
| 3,832,021 A * | 8/1974 | Jennings et al. | .......... | 277/321 |
| 4,099,731 A | 7/1978 | Salter | | |
| 4,866,827 A * | 9/1989 | Benfer et al. | .......... | 277/351 |
| 6,783,131 B2 * | 8/2004 | Martins et al. | .......... | 277/564 |

FOREIGN PATENT DOCUMENTS

| | | |
|---|---|---|
| DE | 36 01 238 | 8/1986 |
| DE | 37 21 265 | 1/1989 |
| EP | 0 297 323 | 1/1989 |
| EP | 1 430 962 | 6/2004 |
| EP | 1 442 804 | 8/2004 |
| EP | 1 447 149 | 8/2004 |
| EP | 1 625 897 | 2/2006 |
| GB | 2174463 | 11/1986 |
| WO | 2005/037455 | 4/2005 |

* cited by examiner

*Primary Examiner* — Gilbert Lee
(74) *Attorney, Agent, or Firm* — Lucas & Mercanti, LLP; Klaus P. Stoffel

(57) ABSTRACT

A journal seal for rolling bearings, wherein the journal seal includes a ring-shaped sealing body, which is rotatably fixed to a roller journal with the bearing surface coaxially oriented in relation to the bearing axis and with at least two spaced webs facing away from the bearing axis. The webs being directly or indirectly in contact with an annular projection. A reinforcing element for that reinforces the sealing body. The reinforcing element has a width that is greater than the outer distance of the two webs.

8 Claims, 3 Drawing Sheets

JOURNAL SEAL FOR ROLLING BEARINGS

BACKGROUND OF THE INVENTION

The invention concerns a roll neck seal for roll bearings, where the roll neck seal has:
- an annular seal body, which is nonrotatably connected with a roll neck with its bearing surface oriented coaxially with the roll axis and with at least two spaced webs that face away from the axis of the roll and that are in direct or indirect contact with an annular projection of the roll bearing, and
- a reinforcing element for reinforcing the seal body.

Neck seals of this type are preferably used for sealing roll neck bearings in rolling mills. They are intended to prevent oil from escaping from the bearing and to prevent foreign materials, for example, coolant or mill scale, from penetrating the bearing. The high speeds of rotation of the rolls of a mill train cause correspondingly high loads on the bearings and the sealing devices due to the effects of centrifugal force. To counteract the effects of the centrifugal force, the seal bodies are reinforced with a reinforcing element. The reinforcing element is incorporated in the seal body or is arranged externally between the spaced webs. FIGS. 1a to 1f show various known embodiments of neck seals.

EP 1 625 897 B1 discloses a seal for the tapered section of a roll neck of a rolling stand. The seal comprises a flexible circular seal body with a central axis and at least one flange that extends radially outward, which flange is connected by a connecting bridge to an angularly extending lip, which has converging first and second sides. The connecting bridge has a reduced thickness compared to the thickness of the flange and the lip. The converging first and second sides of the lip lead to an enlarged rim, and the lip has first and second outer surfaces, which converge to an outer edge, which lies in a reference plane parallel to the central axis A.

DE 36 01 238 C2 discloses a sealing device for roll bearings, in which the roll neck has a tapered section between the end face of the roll and the journal. A flexible annular seal body, which has a radially extending annular sealing rib on the side of the ring that faces the end face of the roll, can be pushed onto this tapered section. When the seal body is being pushed onto the tapered section of the roll neck, the radial pressure that acts to apply a bending moment stresses the annular sealing lip into a position inclined to the axial direction and resting on the outer surface of the tapered section of the roll neck. On its inner annular surface facing the outer surface of the tapered section of the roll neck, displaced parallel relative to the annular sealing lip, the seal body has circular shoulder projections, which apply a bending moment to the seal body under the axial pressure, and this bending moment counteracts the bending moment applied to the annular sealing lip.

Roll neck seals that have two webs constructed with sealing lips and a reinforcing element that supports the seal body are disclosed by DE 37 21 265 A1, EP 1 430 962 A1, EP 1 442 804 B1, EP 1 447 149 A2, WO 2005/037 455 A1, and U.S. Pat. No. 4,099,731.

The previously known sealing devices have been found to have the following disadvantages:
- The externally placed steel rim (=reinforcing element) must have clearance on both sides from the webs, which support the sealing lips.
- As a result of the tapered design of the roll neck, the sealing body must be variably stressed when it is pushed on and during the subsequent operation due to the unequal centrifugal forces produced by unequal arrangement of mass in the axial direction.
- During placement on the roll neck, the rim slips on one side, so that the webs are inclined as a result. Therefore, the seal does not exhibit reproducible behavior.
- The oil centrifugal lip on the oil-side sealing lip can bend over so far that contact occurs with the contact diameter of the oil-side sealing lip.
- The rim, which is held by point welding or butt welding, can tear open at the weld. As a result, the thin steel band then acts as a knife and cuts the rubber seal during the rotation of the roll (total failure).
- Due to the trend in new rolling mills to regrind the backup rolls when wear develops in the chocks, regular inspection of the neck seals is possible only when the chocks are taken down from the roll necks. However, it is just this which one wishes to avoid. As a result, the neck seals must run reliably for longer periods of time.
- The rim slips in the prior art. The neck sleeve presses on the rubber, the rubber swells out; the lip no longer fits well.
- Problem associated with the seal: service life, aging due to thermal stress (frictional heat), becomes hard and cracked.

SUMMARY OF THE INVENTION

Therefore, the objective of the invention is to specify a roll neck seal that avoids the disadvantages cited above.

In accordance with the invention, this objective is achieved by a neck sleeve for roll bearings, wherein the neck seal has:
- an annular seal body, which is nonrotatably connected with a roll neck with its bearing surface oriented coaxially with the roll axis and with at least two spaced webs that face away from the axis of the roll and that are in direct or indirect contact with an annular projection of the roll bearing, and
- a reinforcing element for reinforcing the seal body, and wherein the reinforcing element has a width that is greater than the outside separation of the two webs.

The reinforcing element embedded in the seal body, whose axial extent is greater than the outside separation of the two webs, achieves the result that when the neck seal is being pulled on/pushed on and when it is being rotated during rolling on the roll neck, no tilting moment acts on the webs. There is thus very extensive decoupling between the section of the neck seal that has the webs (facing away from the roll axis) and the section of the neck seal between the reinforcing element and the bearing surface (facing the roll axis).

In a further refinement of this design, it is proposed that the bearing surfaces in contact with the roll neck are each constructed symmetrically to the radial center planes of the webs, and the bearing surfaces, which are constructed independently of each another, are designed in such a way that the radial pressing of the annular seal body occurs in such a way that the prestressing of the webs and their continuation, the sealing lips, relative to the annular projection is equal. In particular, no undesired tilting moments are transferred to the webs and to the sealing lips associated with the annular projection.

The bearing surfaces of the seal body that rest on the roll neck are slightly displaced. However, the displaced material of the seal body is displaced along the reinforcing element at least partially into a cavity, so that no forces or moments act on the webs. The gap thus serves as a forceless receiving space for the displaced material. During this process, the material of the seal body that is to be displaced is located, as viewed in the radial direction, on the side that faces the roll neck, i.e., the side of the reinforcing element that lies opposite the webs. The bearing surfaces that are in contact with the roll neck are each oriented symmetrically to the radial center plane of the webs. As a result of this type of design of the surfaces, the forces acting radially outward on the reinforcing element are equally great over the width of the reinforcing element. The cavity is located between the two surfaces and is designed in such a way that no resistance opposes the material to be displaced. The cavity has the cross-sectional shape of a right triangle, one of whose legs is aligned parallel to the axis of the roll.

In accordance with one embodiment, it is proposed that with increasing axial distance from the roll, the reinforcing element 51 and/or the material of the seal body 50 present at a given time between the reinforcing element 51 and the bearing surface 53-1, 53-2 has increasing stiffness. This achieves the result that the unequal radial centrifugal forces—in different axial positions due to the unequal distribution in the axial direction of the mass of the seal body on the tapered roll neck—are absorbed or compensated. This in turn has the advantageous result that no forces or moments or at least no unsymmetrical forces or moments are transferred to the webs, so that quantitatively equally great tensioning of the sealing lips of the webs relative to the annular projection is ensured.

Further simplification is also realized if the reinforcing element consists of steel, steel fabric, synthetic fabric, Kevlar fabric, aramid fiber or carbon fiber. The use of fabrics or fibers makes it possible to simplify the production of a reinforcing element with variable stiffness, for example, by forming one section of the reinforcing element with five plies and another section with eight plies.

To reinforce the tips of the reinforcing element, it can be provided that the reinforcing element is formed with radial bends directed towards or away from the roll axis. The cross section of the reinforcing element is S-shaped or U-shaped. The legs of the U-shaped reinforcing element point towards or away from the roll axis.

A specific embodiment of the invention is described in greater detail below with reference to the highly schematic drawings.

DETAILED DESCRIPTION OF THE INVENTION

Figure 1A:
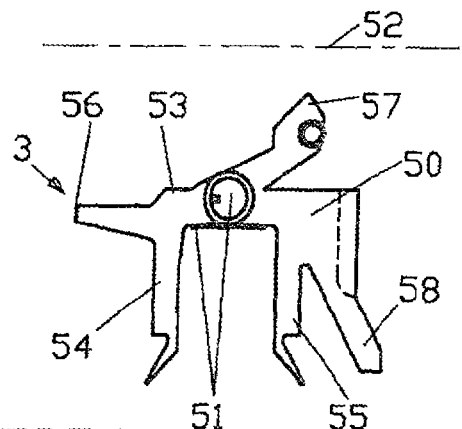
FIGS. 1a-1f show previously known sealing devices in cross section.

FIGS. 1a to 1f show previously known neck seals 3, which have a seal body 50 with a reinforcing element 51. The position of a roll axis 52 is indicated by the dot-dash line. The exact arrangement of the neck seal, roll, etc., can be seen in FIG. 2. The seal body 50 has a bearing surface 53 that points in the same direction as the roll axis 52 and at least two webs 54, 55 that point radially away from the roll axis 52.

Figure 1B:
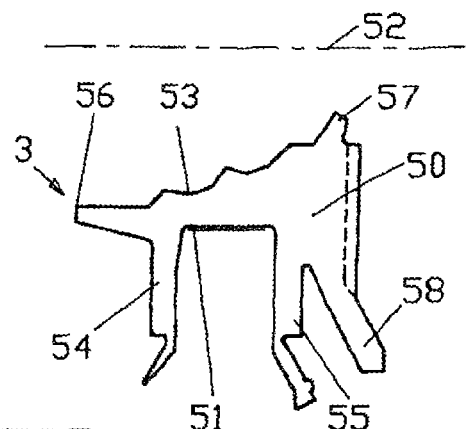

In FIG. 1a, the seal body 50 is constructed with an embedded reinforcing element 51 in the form of a wire cable/helical spring and with a reinforcing element 51 in the form of a metal strip arranged between the webs 54, 55. The bearing surface 53 extends from a left end 56 to a right end 57 and has a contour that fits the roll neck (not shown) in different places in the mounted state. The left end 56 and the right end 57 likewise have different contours. The drawing shows reinforcement of the right end 57 in the form of another reinforcing element. In addition, a centrifugal lip 58, which deflects oil emerging from the gap between the neck sleeve and the bearing bush 6 (see FIG. 2), is located to the right of the web 55. Sealing lips are formed on the webs 54, 55. In FIG. 1b, the sealing lips have different shapes. The seal body 50 shown here does not have an embedded reinforcing element but rather only a reinforcing element 51 located between the webs 54, 55.

Figure 1C:
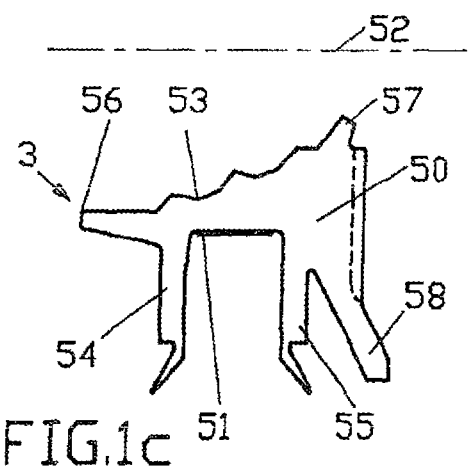

FIG. 1c shows a neck seal 3, in which, as in FIG. 1, the webs 54, 55 are furnished with sealing lips that are mirror images of each other.

Figure 1D:
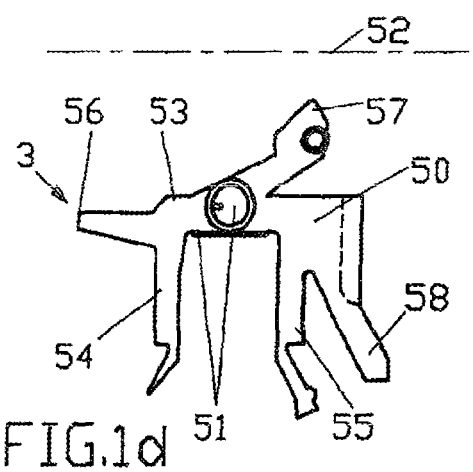
Figure 1E:
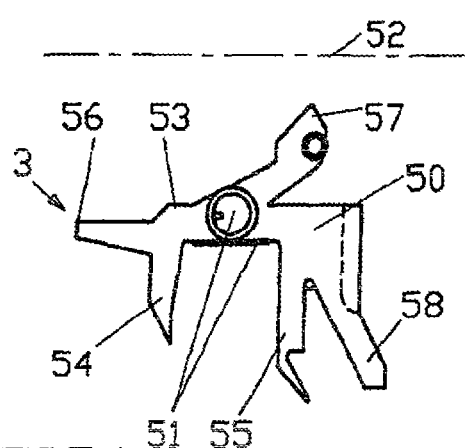

FIG. 1d shows a design of a neck seal 3 according to FIG. 1b but with the reinforcing elements 51 from FIG. 1a. FIG. 1e shows a design according to FIG. 1a but with a different design of the web 54.

Figure 1F:
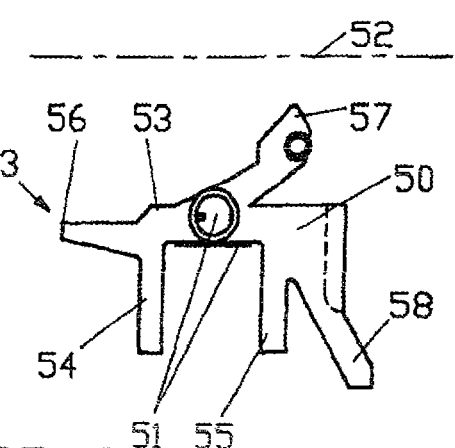

FIG. 1f shows a design of a neck seal 3 in which the webs 54, 55 do not have sealing lips.

Figure 2:
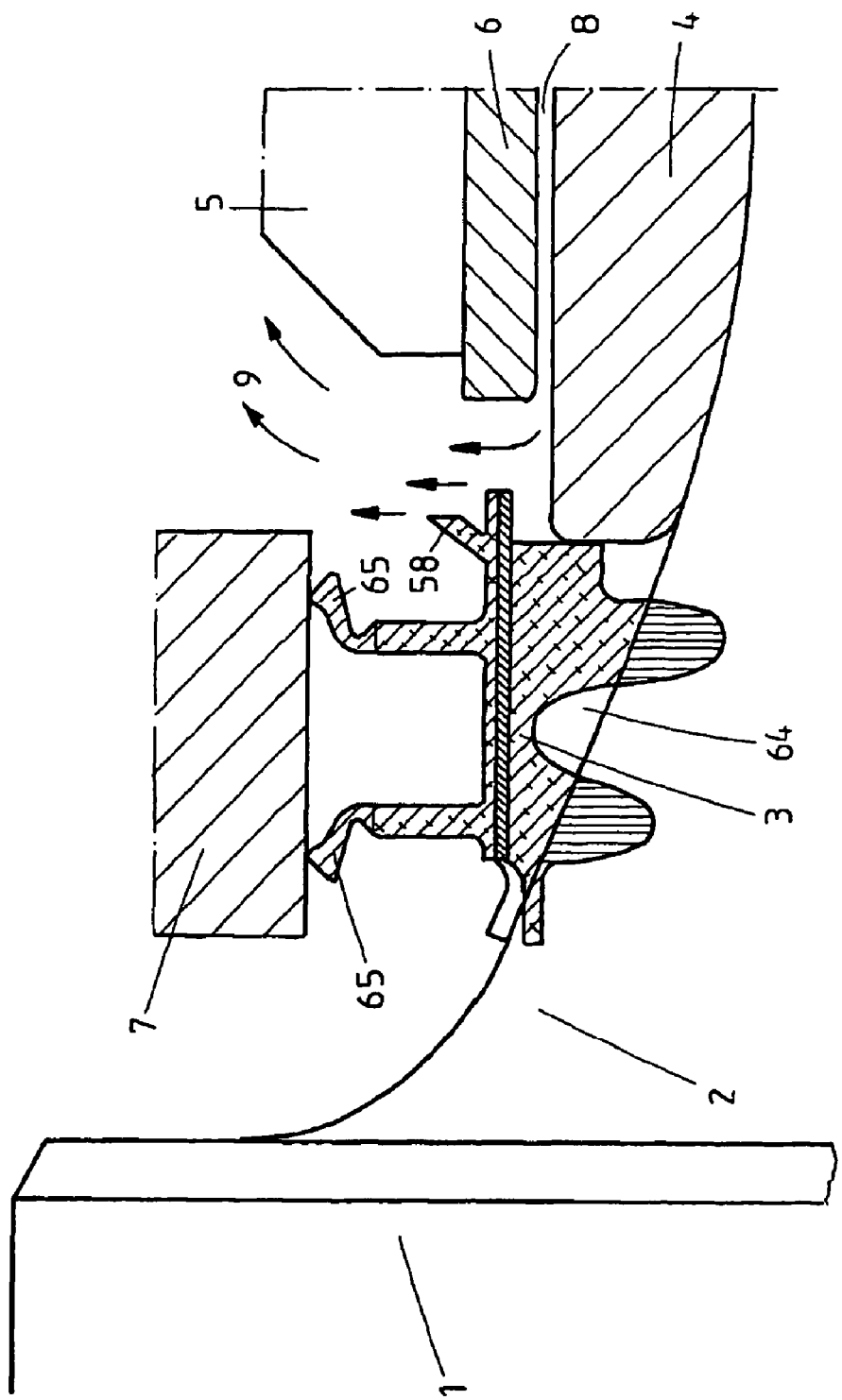
FIG. 2 shows a partially cutaway side view of a sealing device, which has a seal body and a reinforcing element that supports the seal body.

FIG. 2 shows a partially cutaway side view of a roll 1 with a roll neck 2. A neck seal 3 is pushed onto the roll neck 2 by means of a neck sleeve 4, which is mounted nonrotatably on the roll neck 2. The neck sleeve 4 holds the annular neck seal 3 in position. The roll neck 2 with the neck sleeve 4 nonrotatably mounted on it is arranged in a bearing housing 5 with a bearing bush 6. A gap 8, through which a lubricant is conveyed, is located between the rotating neck sleeve 4 and the stationary bearing bush 6. A centrifugal lip 58 is formed on the neck seal 3 to deflect the oil in a certain direction.

Figure 3:
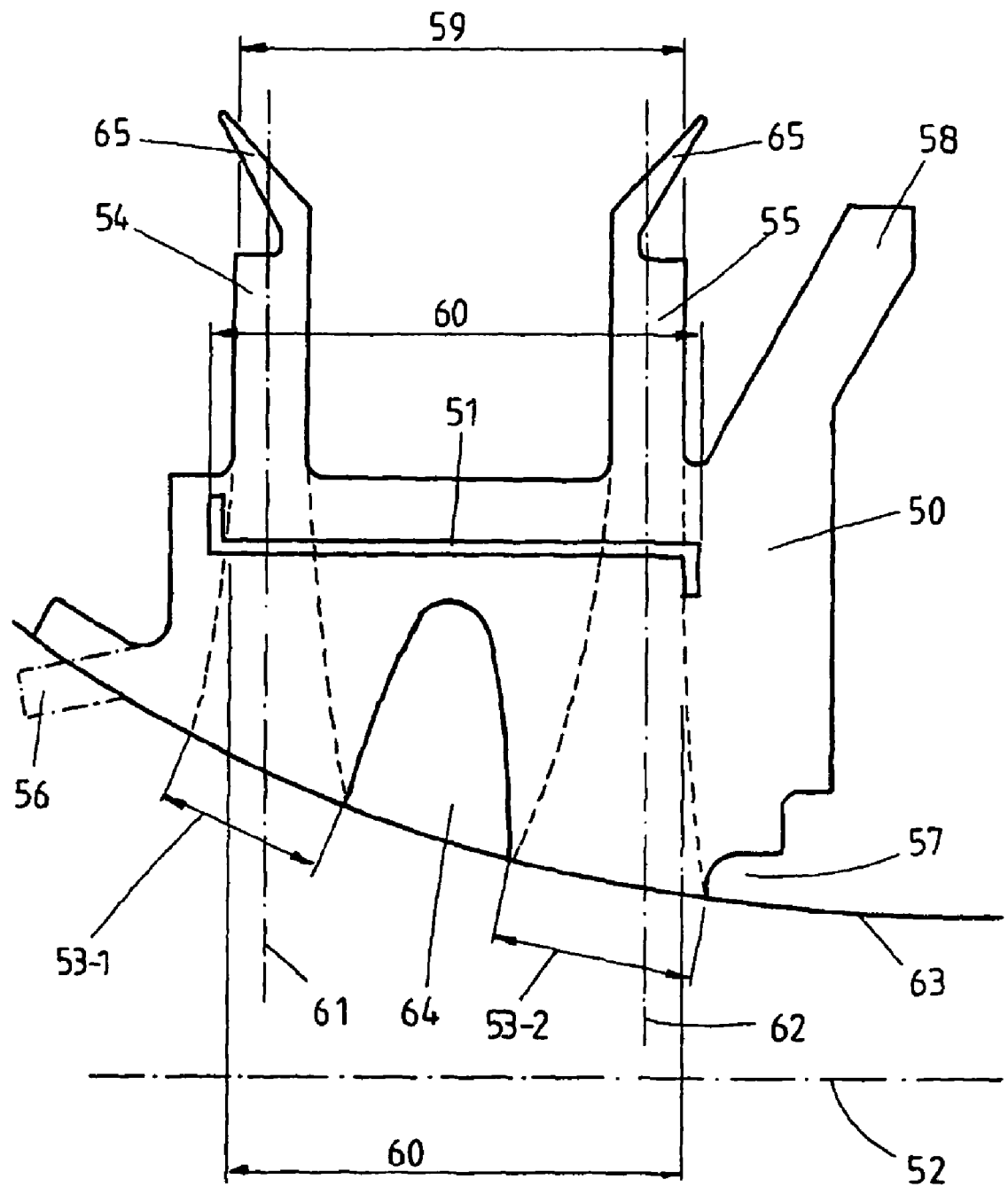
FIG. 3 shows a cross-sectional view of an embodiment of the sealing device of the invention.

FIG. 3 shows a cross-sectional view of an embodiment of the sealing device of the invention. The reinforcing element 51 has a width 60 that is greater than the outside separation 59 of the webs 54, 55. The sealing lip 56 of the seal body 50 is designed to be sufficiently elastic that it can be brought from its initial state (indicated by broken lines) to its mounted state without the application of a large amount of force. The sealing lip 57 of the seal body 50 can have a design that is already well known, for example, as illustrated in FIGS. 1a to 1f. The bearing surfaces 53-1 and 53-2 of the annular seal body 50 are separated from each other by a peripheral cavity 64 and can each be formed independently of each other. In this regard, the contact pressures for the webs 54 and 55 above there with the appended sealing lips 65 are adjusted in such a way that the two sealing lips 65 each have the same initial stressing force towards the annular projection 7 located on the bearing (see FIG. 2). The bearing surfaces 53-1 and 53-2 are each arranged symmetrically to the respective center axis 61 or 62 of the webs 54 or 55.

With increasing axial distance from the roll, the reinforcing element 51 and/or the material of the seal body 50 present at a given time between the reinforcing element 51 and the bearing surface 53-1, 53-2 has increasing stiffness. This can be achieved, e.g., by the use of materials with different moduli of elasticity.

LIST OF REFERENCE NUMBERS 1 roll
2 roll neck
3 neck seal
4 neck sleeve
5 bearing housing
6 bearing bush
7 annular projection
8 gap
9 drainage area 50 seal body
51 reinforcing element
52 roll axis
53 bearing surface
54 web
55 web
56 sealing lip
57 sealing lip
58 centrifugal lip
59 separation
60 width
61 center axis
62 center axis
63 contour
64 cavity
65 sealing lips

The invention claimed is:

1. A roll neck seal for the bearing of a roll in a rolling stand, where the roll neck seal has:
   a single annular seal body (50), which is nonrotatably connected with a roll neck (2) by a bearing surface (53), oriented coaxially with the roll axis (52) and with at least two spaced webs (54, 55) that face away from the roll axis (52) for direct or indirect contact with an annular projection (7) of the roll bearing, and
   a single reinforcing element (51) for reinforcing the seal body (50), wherein the reinforcing element (51) is embedded in the seal body and has a width (60) that is greater than the outside separation (59) of the two webs (54, 55), wherein bearing surfaces (53-1, 53-2) in contact with the roll neck (2) are each constructed symmetrically to radial center planes (61, 62) of the webs (54, 55), and the bearing surfaces, which are constructed independently each other, are designed in such a way that the radial pressing of the annular seal body (50) occurs in such a way that the prestressing of the webs (54, 55) and their continuation, the sealing lips (65), relative to the annular projection (7) is equal, and no tilting moments act on the webs (54, 55).

2. A roll neck seal in accordance with claim 1, wherein with increasing axial distance from the roll, the reinforcing element (51) and/or the material of the seal body (50) present at a given time between the reinforcing element (51) and the bearing surface (53-1, 53-2) has increasing stiffness.

3. A roll neck seal in accordance with claim 1, wherein the reinforcing element (51) consists of steel, steel fabric, synthetic fabric, Kevlar fabric, aramid fiber or carbon fiber.

4. A roll neck seal in accordance with claim 1, wherein the reinforcing element (51) has a radial bend at at least one end.

5. A roll neck seal in accordance with claim 4, wherein the reinforcing element (51) has an S-shaped or U-shaped cross section.

6. A roll neck seal in accordance with claim 1, wherein the reinforcing element (51) is completely embedded in the seal body (50).

7. A roll neck seal in accordance with claim 1, wherein the reinforcing element (51) is partially embedded in the seal body (50).

8. A roll neck seal in accordance with claim 1, wherein the reinforcing element (51) is perforated.

* * * * *